US010312481B2

(12) United States Patent
Shao et al.

(10) Patent No.: US 10,312,481 B2
(45) Date of Patent: Jun. 4, 2019

(54) HOUSING ASSEMBLY AND BATTERY MODULE COMPRISING THE SAME

(71) Applicant: BYD COMPANY LIMITED, Shenzhen, Guangdong (CN)

(72) Inventors: Baolin Shao, Shenzhen (CN); Hongjun Wang, Shenzhen (CN); Chao Zhang, Shenzhen (CN); Fangfang Bu, Shenzhen (CN); Liqiang Chen, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 335 days.

(21) Appl. No.: 15/242,352

(22) Filed: Aug. 19, 2016

(65) Prior Publication Data

US 2016/0359149 A1    Dec. 8, 2016

Related U.S. Application Data (63) Continuation of application No. PCT/CN2015/075499, filed on Mar. 31, 2015.

(30) Foreign Application Priority Data

Mar. 31, 2014  (CN) ..................... 2014 2 0152055 U (51) Int. Cl.
*H01M 2/10* (2006.01)
*H01M 2/20* (2006.01)

(52) U.S. Cl.
CPC ....... *H01M 2/1016* (2013.01); *H01M 2/1077* (2013.01); *H01M 2/1094* (2013.01); *H01M 2/202* (2013.01); *H01M 2/206* (2013.01)

(58) Field of Classification Search
CPC .. H01M 2/1016; H01M 2/202; H01M 2/1094; H01M 2/1077; H01M 2/206
See application file for complete search history.

(56) References Cited

U.S. PATENT DOCUMENTS

| 4,994,940 A | 2/1991 | Thouvenin et al. |
| 5,639,571 A | 6/1997 | Waters et al. |
| (Continued) | | |

FOREIGN PATENT DOCUMENTS

| CN | 1041683 A | 4/1990 |
| CN | 1623241 A | 6/2005 |
| (Continued) | | |

OTHER PUBLICATIONS

European Search Report for Application No. EP 15773308.0, dated Oct. 14, 2016, 3 pages.

(Continued)

*Primary Examiner* — Muhammad S Siddiquee
(74) *Attorney, Agent, or Firm* — Sheppard Mullin Richter & Hampton LLP (57) ABSTRACT

A housing assembly for a battery module includes a plurality of brackets disposed side by side in the front-rear direction and connected by a snap, and each two adjacent brackets defining a space for receiving the battery; a plurality of copper bars disposed vertically on the brackets and having a through-hole adapted for extending an electrode of the battery; and a plurality of insulating frames disposed on the copper bars to cover the electrodes of the batteries; wherein the insulating frame is connected with the bracket by a snap and has an extension direction as same as that of the copper bar. A battery module including the housing assembly is also provided.

20 Claims, 7 Drawing Sheets

(56) References Cited

U.S. PATENT DOCUMENTS

| | | | |
|---|---|---|---|
| 5,736,272 A | 4/1998 | Veenstra et al. | |
| 5,981,101 A | 11/1999 | Stone | |
| 6,451,475 B1 | 9/2002 | Sherwood | |
| 2010/0025137 A1 | 2/2010 | Mughal | |
| 2011/0117401 A1 | 5/2011 | Lee et al. | |
| 2011/0117419 A1 | 5/2011 | Lee et al. | |
| 2011/0206948 A1* | 8/2011 | Asai | H01M 2/0473 429/7 |
| 2011/0256446 A1* | 10/2011 | Bronczyk | H01M 2/1077 429/163 |
| 2013/0143102 A1 | 6/2013 | Jiang et al. | |
| 2013/0177793 A1 | 7/2013 | Seki | |
| 2014/0093765 A1* | 4/2014 | Kusunoki | H01M 2/1072 429/120 |

FOREIGN PATENT DOCUMENTS

| | | |
|---|---|---|
| CN | 2724209 Y | 9/2005 |
| CN | 201038257 Y | 3/2008 |
| CN | 101326657 A | 12/2008 |
| CN | 201466121 U | 5/2010 |
| CN | 201554131 U | 8/2010 |
| CN | 201708212 U | 1/2011 |
| CN | 102088104 A | 6/2011 |
| CN | 202004065 U | 10/2011 |
| CN | 202084607 U | 12/2011 |
| CN | 102388480 A | 3/2012 |
| CN | 102414871 A | 4/2012 |
| CN | 202363531 U | 8/2012 |
| CN | 102687310 A | 9/2012 |
| CN | 202434596 U | 9/2012 |
| CN | 102769120 A | 11/2012 |
| CN | 102779954 A | 11/2012 |
| CN | 102893426 A | 1/2013 |
| CN | 202797124 U | 3/2013 |
| CN | 203134883 U | 8/2013 |
| CN | 203871400 U | 10/2014 |
| CN | 204144348 U | 2/2015 |
| CN | 104953056 A | 9/2015 |
| CN | 104953082 A | 9/2015 |
| EP | 2325923 A1 | 5/2011 |
| EP | 2362463 A2 | 8/2011 |
| EP | 2362463 A3 | 8/2011 |
| GB | 2446229 A | 8/2006 |
| JP | 10-125292 A | 5/1998 |
| JP | 2005-129267 A | 5/2005 |
| JP | 4734826 B2 | 7/2011 |
| KR | 10-1227654 B1 | 1/2013 |
| KR | 2013-0017289 A | 2/2013 |
| WO | 2012/043594 A1 | 4/2012 |

OTHER PUBLICATIONS

International Search Report and Written Opinion for PCT/CN2015/075499, dated Jun. 30, 2015, 13 pages.

* cited by examiner

HOUSING ASSEMBLY AND BATTERY MODULE COMPRISING THE SAME

CROSS-REFERENCE TO RELATED APPLICATION

This application is a continuation application of International Application No. PCT/CN2015/075499, filed on Mar. 31, 2015, which is based on and claims priority to and benefits of Chinese Patent Application Serial No. 201420152055.X, filed with the State Intellectual Performance Office of P. R. China on Mar. 31, 2014. The entire contents of the above-referenced applications are incorporated herein by reference.

FIELD

Embodiments of the present disclosure relate to the field of battery, more particularly to a housing assembly and a battery module comprising the same.

BACKGROUND

The statements in this section merely provide background information related to the present disclosure and may not constitute prior art.

Commonly, housing assemblies for battery modules have low adaptability, so that the housing assemblies must be designed in different forms to fit different combinations of the batteries in production, causing the manufacturing cost high.

SUMMARY

This summary is provided to introduce a selection of concepts in a simplified form that are further described in the section below. This summary is not intended to identify key features or essential features of the claimed subject matter, nor is it intended to be used as an aid in determining the scope of the claimed subject matter.

Embodiments of the present disclosure seek to solve at least one of the problems existing in the prior art to at least some extent.

Embodiments of a first broad aspect of the present disclosure provide a housing assembly for a battery module. The housing assembly according to embodiments of the present disclosure includes:
a plurality of brackets, disposed side by side in the front-rear direction and connected by a snap, and each two adjacent brackets defining a space for receiving a battery; a plurality of copper bars, disposed vertically on the brackets, and having a through-hole adapted for an extension of an electrode of the battery; and a plurality of insulating frames, disposed on the copper bars to cover the electrodes of the batteries. The insulating frame is connected with the bracket by a snap and extends in the same direction as that of the copper bar Embodiments of a second broad aspect of the present disclosure further provide a battery module including the above-identified housing assembly and batteries received in the housing assembly.

With the flexible combination of the brackets to fix the batteries, the copper bars connected with the electrodes, and the insulating frames covering and protecting the electrodes, the battery module may be combined according to the needs, which has the advantageous of simple structure, easy operation, high adaptability, low manufacturing cost and modular design is implemented to the battery module.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of the disclosure will become apparent and more readily appreciated from the following descriptions taken in conjunction with the drawings, in which.

DETAILED DESCRIPTION

Reference will be made in detail to embodiments of the present disclosure. The embodiments described herein with reference to drawings are explanatory, illustrative, and used to generally understand the present disclosure. The embodiments shall not be construed to limit the present disclosure. The same or similar elements and the elements having same or similar functions are denoted by like reference numerals throughout the descriptions.

In the specification, it should be understood that, the terms such as "central", "longitudinal", "lateral", "width", "thickness", "above", "below", "front", "rear", "right", "left", "vertical", "horizontal", "top", "bottom", "inner", "outer", "clockwise", "counter-clockwise" should be construed to refer to the orientation as then described or as shown in the drawings. These terms are merely for convenience and concision of description and do not alone indicate or imply that the device or element referred to must have a particular orientation. Thus, it cannot be understood to limit the present disclosure.

In addition, terms such as "first" and "second" are used herein for purposes of description and are not intended to indicate or imply relative importance or significance or impliedly indicate quantity of the technical feature referred to. Thus, the feature defined with "first" and "second" may comprise one or more this feature. In the description of the present disclosure, "a plurality of" means two or more than two this features, unless specified otherwise.

In the present disclosure, unless specified or limited otherwise, the terms "mounted," "connected," "coupled," "fixed" and the like are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

In the present disclosure, unless specified or limited otherwise, a structure in which a first feature is "on" or "below" a second feature may include an embodiment in which the first feature is in direct contact with the second feature, and may also include an embodiment in which the first feature and the second feature are not in direct contact with each other, but are contacted via an additional feature formed therebetween. Furthermore, a first feature "on," "above," or "on top of" a second feature may include an embodiment in which the first feature is right or obliquely "on," "above," or "on top of" the second feature, or just means that the first feature is at a height higher than that of the second feature; while a first feature "below," "under," or "on bottom of" a second feature may include an embodiment in which the first feature is right or obliquely "below," "under," or "on bottom of" the second feature, or just means that the first feature is at a height lower than that of the second feature.

As shown in FIGS. 1-7, in one embodiment, a housing assembly 200 for a battery module is provided. The housing assembly 200 may include: a plurality of brackets 1, a plurality of copper bars 2 and a plurality of insulating frames 3.

Figure 1:
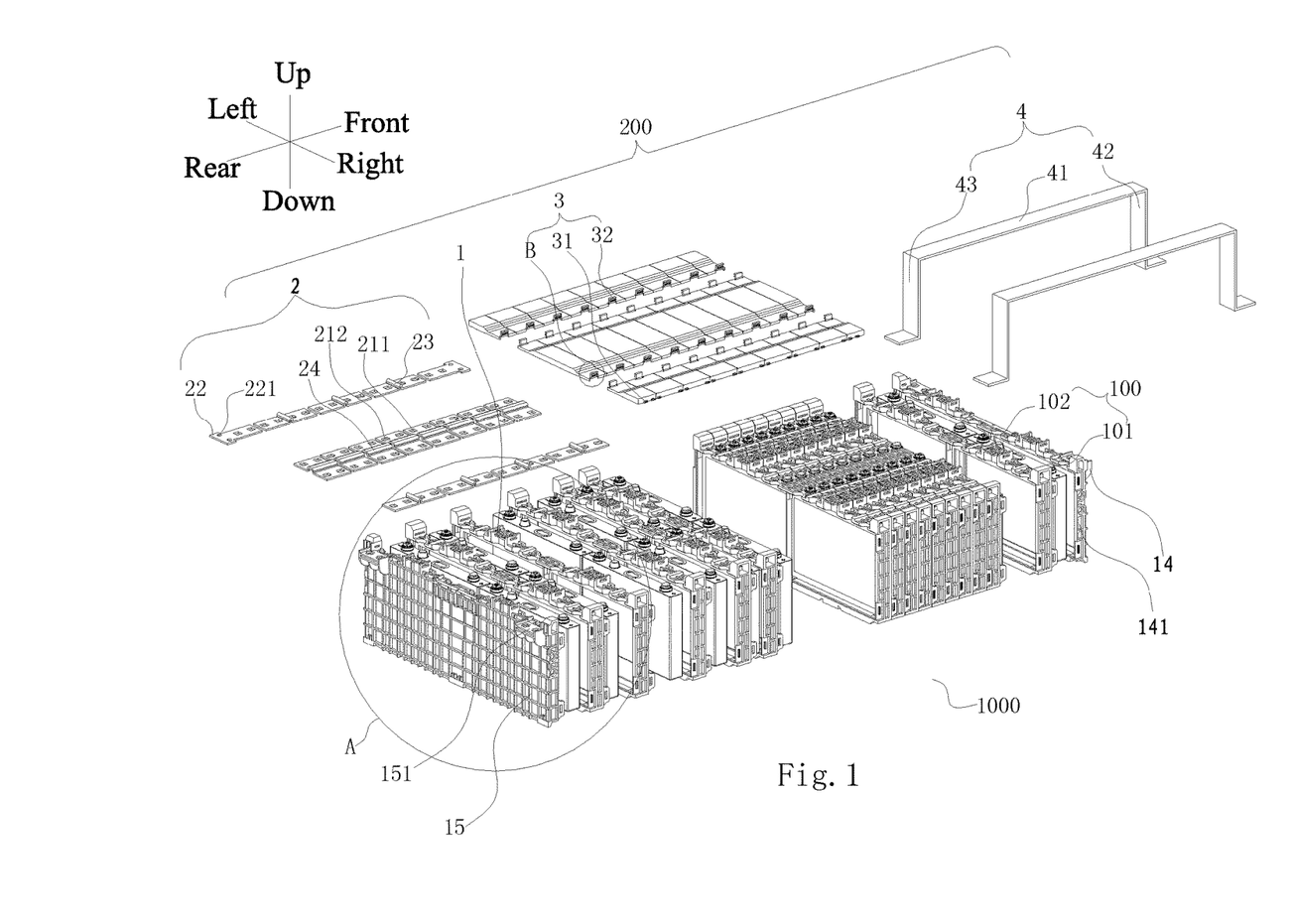
FIG. 1 is a schematic exploded view of a battery module according to an embodiment of the present disclosure.

In some embodiments, two adjacent brackets 1 define a space for receiving a battery 100. As shown in FIG. 1, each battery 100 is configured as substantially cubic shape, and each bracket 1 is configured as substantially rectangular frame. The bracket 1 includes a top plate 111, a base plate 112, a left side plate 113, and a right side plate 114. The top plate 111 and the base plate 112 are adapted to support the battery 100 in an up-down direction. The left side plate 113 and the right side plate 114 are adapted to support the battery 100 in the left-right direction. By the supporting function of the top plate 111, the base plate 112, the left side plate 113 and the right side plate 114, the battery 100 is fixed in the bracket 1. Thereby, the battery 100 is fixed by two adjacent frames along the front-rear direction. Each two adjacent brackets 1 define a space for receiving the battery 100.

In some embodiments, each bracket 1 may fix two batteries 100 together, and each of the two batteries is fixed on the front and rear side of the bracket 1 respectively. At this time, the width of the bracket 1 in the front-rear direction is substantially equal to the width of the battery 100.

In some embodiments, the bracket further includes a bracket separator 115 disposed on a longitudinal center plane of the bracket 1. The bracket separator 115 may extend upwardly from a longitudinal center line of the base plate 112, or extend downwardly from a longitudinal center line of the top plate 111, whereby the bracket 1 is separated into front part and rear part by the bracket separator 115.

The sizes of the width of front part and rear part of the bracket in the front-rear direction are substantially equal to the thickness of the battery 100, and substantially equal to the one-half of thickness of the battery 100 respectively. In this way, the battery 100 fixed by the bracket 1 and separated by the bracket separator 115, so that avoid the problems of expansion extrusion or temperature rise due to the battery 100 generating heat during operation, which may also effectively extend the life of the battery 100.

Figure 2:
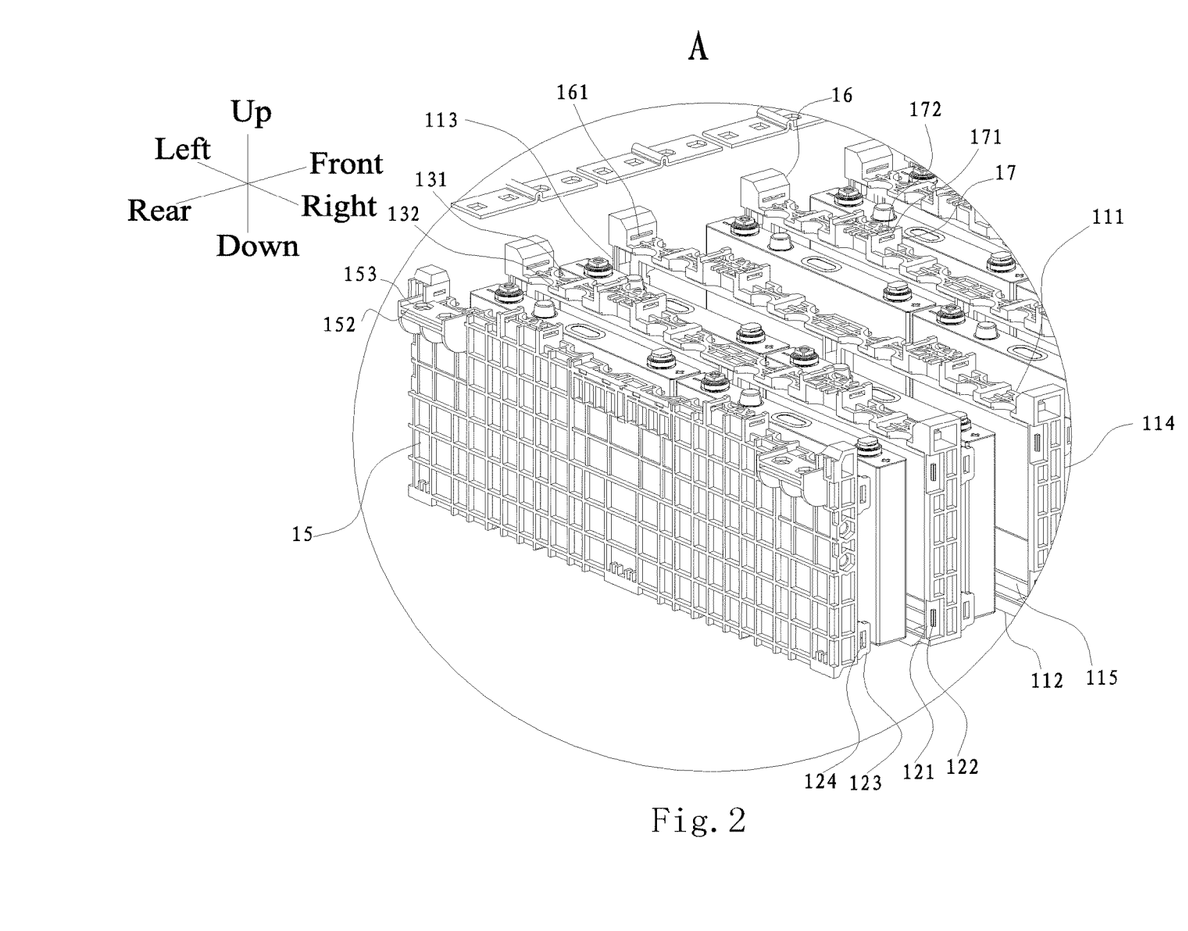
FIG. 2 is an enlarged schematic view of the part A indicated in FIG. 1 according to an embodiment of the present disclosure.

In some embodiments, the brackets 1 are disposed side by side in the front-rear direction and connected by a snap. As shown in FIG. 2, the plurality of brackets 1 are disposed side by side in the front-rear direction and each two adjacent brackets 1 define a space for receiving the battery 100, and each two adjacent brackets are connected by the a snap. In some embodiments, the snap may configured as a snap-fit structure including a positioning projection 122 and a positioning hole 124. The positioning projection 122 and the positioning hole 124 are matched with each other. In some embodiments, the positioning projection 122 and the positioning hole 124 may be left-right symmetrically disposed on the left side plate 113 and the right side plate 114 respectively to improve the strength of the adjacent brackets 1. In the following, the embodiment is described with the example that the positioning projection 122 and the positioning hole 124 are disposed on the left side plate 113. Certainly, the structure of the snap is not limited thereto.

As shown in FIG. 2, in some embodiments, a stopper 123 is disposed on the upper part and the lower part of the left side plate 113 respectively. The shape of the stopper is configured as a substantially trapezoid, and the stopper is formed by extending from the front end of the left side plate 113. Accordingly, a stopper groove 121 is disposed on the upper part and the lower part of the left side plate 113 respectively. In some embodiments, the shape of the stopper groove 121 is configured as substantially rectangle, and the stopper groove 121 is formed by forward concaving from the rear end of the left side plate 113, and the outer side of the stopper groove 121 is opened. Each stopper 123 of the bracket 1 is adapted to fit with the stopper groove 121 of the bracket 1 disposed next by it. In some embodiments, the positioning hole 124 penetrates the stopper 123 in the front-rear direction, and the positioning projection 122 is disposed on the stopper groove 121. The positioning projection 122 is protruded from the left of the stopper groove 121 and matched with the positioning hole 124 to form the snap connection. When the positioning projection 122 of the bracket 1 is snapped with the positioning hole 124 of the adjacent bracket 1, the brackets 1 are sequentially connected together along the front-rear direction.

In some embodiments, the copper bar is disposed vertically on the bracket, and the copper bar has a through-hole adapted for an extension of an electrode of the battery 100. As shown in FIG. 2, the electrode includes a positive electrode 101 and a negative electrode 102. The positive electrode 101 and the negative electrode 102 are disposed on each left and right ends of the top of the battery 100 respectively. Each top plate 111 has an electrode hole 131 formed thereon, and the electrode hole 131 is adapted to receive the positive electrode 101 or the negative electrode 102. The position of electrode hole 131 and the positive electrode 101 or the negative electrode 102 are aligned, so that the positive electrode 101 and the negative electrode 102 may protrude through the top plate 111, and the copper bar 2 is mounted horizontally on the bracket 1 and located over the electrode. Each copper bar has the through-hole adapted for an extension of an electrode of the battery 100, which may ensure that the electrode may pass through the corresponding through-hole and fitted in the copper bar 2. In this way, the positive electrode 101 and the negative electrode 102 of the batteries may be connected in parallel or in series to form an electrical connection. As shown in FIG. 1, the through-hole including a first through-hole 212 for matching with the positive electrode 101, and a second through-hole 211 for matching with the negative electrode 102. In some embodiments, the first through-hole 212 is configured as a square through-hole, and the second through-hole 211 is configured as an oblong through-hole. In addition, the top of the bracket may further include a copper bar position groove 132.

The copper bar position groove 132 is configured to stably and securely fix the copper bar to the top of the bracket 1.

In some embodiments, as shown in FIG. 1, a plurality of the battery 100 are disposed in the left-right direction, and a plurality of the battery 100 are also disposed in the front-rear direction, to form a row of the battery 100. Rows of the batteries 100 are disposed sequentially in the left-right direction to constitute a battery module 1000. The battery module 1000 has a plurality of rows of the electrodes extending in the front-rear direction, and rows of the electrodes are parallel to each other in the left-right direction. The top of the bracket 1 may set rows of the copper bars 2 extending along the front-rear direction, and the rows of the copper bars 2 may be parallel respectively in the left-right direction, so that to ensure the electrode may pass through the corresponding through-hole of the copper bar 2. In some embodiments, each row of copper bars may include only one copper bar 1, and the copper bar 1 extends along the left-right direction. In some embodiments, a row of the copper bars may include more than one copper bars, and the copper bars are arranged sequentially side by side in the front-rear direction.

Figure 4:
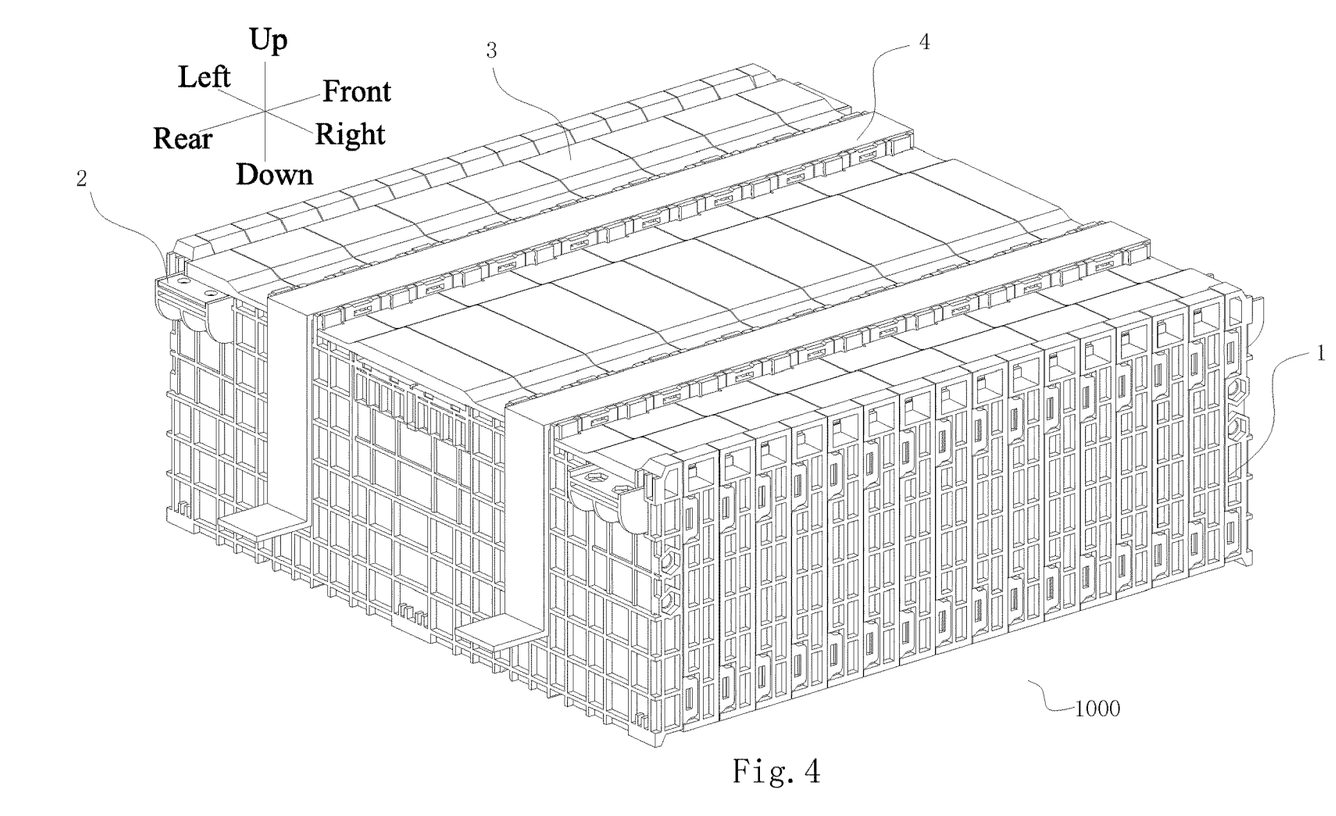
FIG. 4 is a perspective view of a battery module according to an embodiment of the present disclosure.

In some embodiments, a plurality of insulating frames 3 are disposed on the copper bars 2 to cover the electrodes of the batteries 100. The insulating frame 3 is connected with the bracket 1 by a snap, and extending directions of the insulating frame 3 and the copper bar 2 are the same. As shown in FIG. 1 and FIG. 4, the insulating frame 3 is horizontally mounted on the copper bar 2. Each row of the insulating frame 3 are arranged in parallel in the left-right direction and extended in the front-rear direction, so that the insulating frames 3 may cover the copper bars 2 to cover the corresponding electrodes. It can avoid the unintentional disconnection or shorting problems when the electrodes are connected in series or in parallel. In some embodiments, the insulating frame 3 may fix with the bracket 1 by a snap. In some embodiments, the snap may include a first tab 31 and a first hole 161, and a second tab 32 and a second hole 171. In some embodiments, each row of insulating frames may include one insulating frame 3, and the insulating frame 3 extends along the left-right direction. In some embodiments, a row of the insulating frames 3 may include more than one insulating frames 3, and the insulating frames 3 are arranged sequentially side by side in the front-rear direction.

In some embodiments, a housing assembly 200 for the battery module 100 is provided. The housing assembly 200 may fix the batteries 100 by brackets, and the copper bars 2 are connected with the electrodes of the batteries 100, and the insulating frames cover the electrodes of the batteries 100, which may flexibly combine the battery module 1000 according to the needs, therefore, it has the advantages of simple structure and easy operation, and the battery module 1000 may be implemented to modular design, and has the advantages of high applicability and low production costs.

In some embodiments, the brackets 1 include a front bracket 14 disposed on the frontmost side of the brackets and a rear bracket 15 disposed on the rearmost side of the brackets 1. The front bracket 14 has two front fixing blocks 141 located at the front side of the front bracket 14, and the rear bracket 15 has two rear fixing blocks 151 located at the rear side of the rear bracket. The two front fixing blocks 141 and the two rear fixing blocks 151 are corresponding to each other in the front-rear direction. As shown in FIG. 1 and FIG. 2, the front bracket 14 is disposed on the frontmost side of the battery module 1000, and the front fixing block 141 is disposed on the left side and the right side of the top of the front bracket 14, respectively. The front fixing block 141 is horizontally extended forward from the front side of the front bracket 14. The rear bracket 14 is disposed on the rearmost side of the battery module 1000, and the rear fixing block 151 is disposed on the left side and the right side of the top of the rear bracket 15, respectively. The rear fixing block 151 is horizontally extended rearward from the rear side of the rear bracket 15. The two front fixing blocks 141 and the two rear fixing blocks 151 are left-right symmetrical and front-rear symmetrical.

In some embodiments, the copper bars 2 include a left copper bar 2 disposed on the leftmost side of the copper bars 2 and a right copper bar 2 disposed on the rightmost side of the copper bars 2. The front side of the left copper bar and the front side of the right copper bar are disposed on the two front fixing blocks 141 respectively. The rear side of the left copper bar 2 and the front side of the right copper bar 2 are disposed on the two rear fixing blocks 151 respectively. As shown in FIG. 1, FIG. 2 and FIG. 4, the left copper bar 2 is dispose on the leftmost side of the battery module 1000, and the front end of the left copper bar 2 extends forward and locates on the left side of the front fixing block 141 of the front bracket 14. The rear end of the left copper bar 2 extends rearward and locates on the left side of the rear fixing block 151 of the rear bracket 15. The right copper bar 2 is dispose on the rightmost side of the battery module 1000, and the front end of the right copper bar 2 extends forward and locates on the right side of the front fixing block 141 of the front bracket 14. The rear end of the right copper bar 2 extends rearward and locates on the right side of the rear fixing block 151 of the rear bracket 15. Thus, the anode and the cathode directions of the battery module 1000 may be adjusted by adjusting the connection manner of the copper bars 2 and the anode and the cathode direction of the battery 100 according to the needs, to facilitate the connection between the battery modules 1000.

In some embodiments, each of the front fixing block 141 and the rear fixing block 151 has a flat upper surface 152. A supporting part 22 is disposed on the front end and the rear end of the left copper bar 2 and the front end and the rear end of the right copper bar 2 respectively to match with the flat upper surface 152. As shown in FIG. 2, the shape of each flat upper surface 152 is configured as a substantially rectangle, and the flat upper surface 152 is formed with a mounting groove concaving downwardly. And two first through holes 153 are formed on the mounting groove along an up-down direction. The shape of the supporting part 22 is configured as a substantially rectangle, and the shape of the supporting part 22 is matched with the shape of the mounting groove. Two second through holes 221 is formed on the supporting part 22 along the up-down direction. The second through holes 221 are in one to one correspondence with the first through hole 153, so that when the supporting part 22 is matched with the flat upper surface 152, the through hole 221 is correspondence with the first through hole 153 one by one in the up and down direction.

In some embodiments, as shown in FIG. 1, two adjacent copper bars 2 in the front-rear direction of remaining copper bars 2 between the left copper bars and the right copper bars are connected by a first connecting portion 23. In some embodiments, the electrodes of the adjacent batteries are disposed closely, and the copper bars over the electrodes are also disposed closely, with the first connecting portion 23, the adjacent copper bars are connected, which may facilitate the mounting of the copper bars and improve the assemble efficiency. In some embodiments, the shape of the first connecting portion 23 is configured as an inverted U, and the first connecting portion 23 extends along the left-right direction. The front end of the first connecting portion 23 is connected with the rear end of the copper bar disposed on front side, and the rear end of the first connecting portion 23 is connected with the front end of the copper bar 2 disposed on rear side, so that the adjacent copper bars constitute a row of first copper bars. Two rows of the copper bars may be connected without the first connecting portion 23, to achieve a modular design, and then flexibly combine to the battery module 1000 of different shapes.

Figure 3:
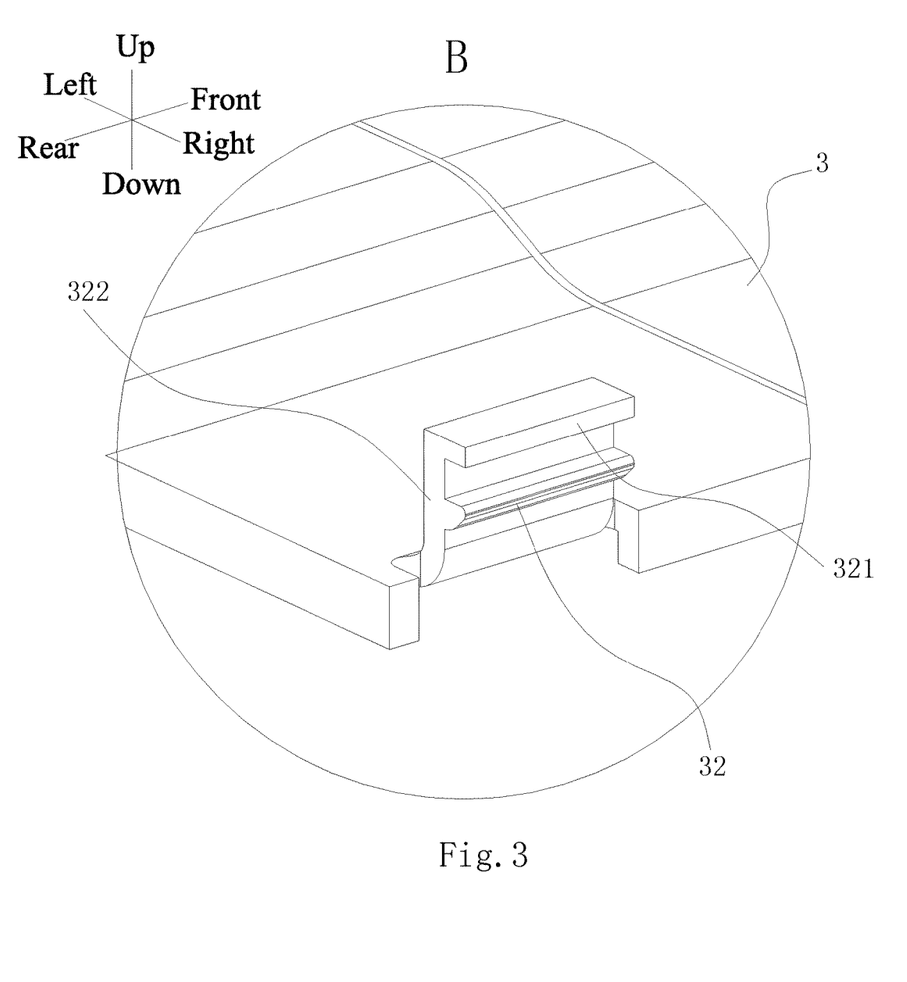
FIG. 3 is an enlarged schematic view of the part B indicated in FIG. 1 according to an embodiment of the present disclosure.

As shown in FIG. 3, in two middle copper bars arranged in a middle of the plurality of copper bars, i.e. two adjacent copper bars between the left and right copper bars, a copper bar block of one of the middle copper bars and a copper bar block of the other of the middle copper bars corresponding to each other in a left-right direction are connected by a second connecting portion 24. In some embodiments, the electrodes of the adjacent batteries are disposed closely, and the copper bars over the electrodes are also disposed closely, with the second connecting portion 24, the adjacent copper bars are connected, which may facilitate the mounting of the copper bars and improve the assemble efficiency. In some embodiments, the shape of the second connecting portion 24 is configured as an inverted U, and the second connecting portion 24 extends along the front-rear direction. The left end of the second connecting portion 24 is connected with the right end of the copper bar disposed on left side, and the right end of the second connecting portion 24 is connected with the left end of the copper bar 2 disposed on right side, so that the adjacent copper bars constitute a row of second copper bars. Certainly, two rows of the copper bars may connect without the second connecting portion 24, to achieve a modular design, and then flexibly combine to the battery module 1000 of different shapes.

In some embodiments, a row of the insulating frames includes a plurality of insulating frames 3, and the insulating frame 3 extends along the left-right direction, and the rows of the insulating frames is arranged apart in the left-right direction. As shown in FIG. 1, the battery module 1000 includes two rows of the batteries 100 along the front-rear direction, and the batteries 100 are fixed by a row of brackets 1 arranged along the front-rear direction. Two spaced batteries 100 in the left-right direction are fixed by the front side and rear side of the bracket 1. Four rows of the electrodes are arranged on the top of the two rows of the batteries 100 along the front-rear direction. The two rows of electrodes are arranged close to the center of the battery module 1000 in the left-right direction, and the other rows of the electrodes are arranged close to left and right side of the battery module 1000 in the left-right direction. Three rows of the insulating frames 3 are arranged in the left-right direction to space apart the brackets 1. The insulating frames 3 disposed on the left-most side are configured to cover the row of electrodes disposed on the left side, and the insulating frames 3 disposed on the right-most side are configured to cover the row of electrodes disposed on the right side. The insulating frames 3 disposed between the left-most side and right-most side are configured to cover the two middle adjacent rows of electrodes.

In some embodiments, the insulating frames 3 include a left insulating frame disposed on the leftmost side of the insulating frames 3 and a right insulating frame disposed on the rightmost side of the insulating frames 3. A first tab 31 is disposed on the left side of the left insulating frame 3 and on the right side of the right insulating frame 3, and a first hole 161 is formed on the left side and right side the bracket 1 respectively and configured to match with the first tab 31. In some embodiments, a mounting base 16 is disposed on the left side and the right side of the bracket 1 respectively, and the first hole 161 is formed on the opposite side of the mounting base 16, thus, the insulating frames 3 may be firmly secured to the bracket 1.

As shown in FIG. 1, the insulating frame 3 extends from the left-right direction, and the width of the insulating frame 3 in the front-rear direction is equal to the width of the bracket 1 in the front-rear direction. The first tab 31 is disposed on the left side of the left insulating frame 3, and the first tab 31 projects leftward from the left end surface of the insulation frame 3. The mounting base 16 is disposed on the left side of the bracket 1. The mounting base 16 vertically extends upward from the top of the left end of the bracket 1, and the right end surface of the mounting table 16 is formed with the first hole 161 recessed leftward. The first hole 161 is corresponding to the first tabs 31 and may match mutually. When the insulating frame 3 is mounted on the bracket 1, the first tab 31 of the insulation frame 3 is inserted within the first hole 161, so that the insulating frame 3 is fixed with the bracket 1. In some embodiments, the width of the insulation frame 3 in the front-rear direction is equal to two or three brackets 1 in the front-rear direction, and with the matching of the first tab 31 and the first hole 161, the insulation frame 3 may be connected together with the two or three brackets 1.

In some embodiments, as shown in FIG. 1 and FIG. 2, the cross section of the first tab 31 is configured as a trapezoid or a wedge shape, and the cross section of the first hole 161 is configured a rectangle, whereby the first tabs 31 may easily be inserted into the corresponding first hole 161, thus the assembly efficiency is improved. Certainly, the shape, number or position of the first tabs 31 and the first hole 161 may be designed according to actual requirements. In some embodiments, the first tab 31 is disposed on the right side of the right insulating frame 3, and the first hole 161 is formed on the right side the bracket 1 and configured to match with the first tab 31. The matching manner between the first tab 31 in the right side of the right insulating frame 3 and the first hole 161 formed on the left side the bracket 1 is similar with the first tab 31 in the left side and the first hole 161 formed on the right side the bracket 1, and is not described in detail here.

In some embodiments, as shown in FIG. 1, the insulating frame 3 includes a middle insulating frame disposed between the left insulating frame and the right insulating frame. A second tab 32 is disposed on the left side and right side of the middle insulating frame, and a second hole 171 is formed on the bracket 1 and configured to match with the second tab 32. In some embodiments, an extension plate 17 extends upwardly on the bracket 1 and the second hole 171 is formed on the extension plate 17, so that the insulating frame 3 may be fixed to the bracket 1 more securely.

In some embodiments, the insulating frame 3 extends from the left-right direction, and the width of the insulating frame 3 in the front-rear direction is equal to the width of the bracket 1 in the front-rear direction. The second tab 32 is disposed on the left side of the left insulating frame 3, and the second tab 32 is arranged to locate on the end away from the first tab 31. As shown in FIG. 1, the right end surface of the insulating frame 3 is provided with a locking plate 322 extending upwardly, and the second tab 32 may horizontally protrude rightward from the right surface of the locking plate 322. The extension plate 17 is disposed on the top of the bracket 1. The extension plate 17 extends upwardly from the right side of the left end of the bracket 1. The second hole 171 is formed on the extension plate 17 and the second hole 171 penetrates the extension plate 17 along the left-right direction. The second hole 171 is matched with the second tab 32. When the insulating frame 3 is mounted on the bracket 1, the second tab 32 of the insulation frame 3 is inserted within the second hole 171, so that the insulating frame 3 is fixed with the bracket 1. In some embodiments, the width of the insulation frame 3 in the front-rear direction is equal to two or three brackets 1 in the left-right direction, and with the matching of the second tab 32 and the second hole 171, the insulation frame 3 may be connected together with the two or three brackets 1.

As shown in FIG. 1, the cross section of the second tab 32 is configured as a trapezoid or a wedge shape, and the cross section of the second hole 171 is configured a rectangle, whereby the second tab 32 may easily be inserted into the corresponding second hole 171, thus the assembly efficiency is improved. Certainly, the shape, number or position of the second tab 32 and the second hole 171 may be designed according to actual requirements. In some embodiments, the second tab 32 is also disposed on the right side of the right insulating frame 3. The first tab 31 and the second tab 32 is located on the left and right side of the insulated frame 3 respectively. In some embodiments, the second tab 32 is also disposed on the left side and right side of the middle insulating frame, and the second hole 171 is formed on the bracket 1 and configured to match with the second tab 32. Each group of the matching method between the second tab 32 and the second hole 171 is similar, and is not described in detail here.

As shown in FIG. 1 and FIG. 3, the surface of the extension plate 17 is concaved downwardly to form a concave 172, and a horizontal plate 321 on a top of the second tab 32 is matched with the concave 172. The horizontal plate 321 is configured as a substantially rectangle, and the concave 172 is configured as a substantially trapezoid. The horizontal plate 321 extends from the top of the locking plate 322 and away from the insulating frame 3, and is adapted to fit within the concave 172 in the extension plate 17. Thereby, the connection strength between the bracket 1 and the insulating frame 3 may be further improved.

Figure 5:
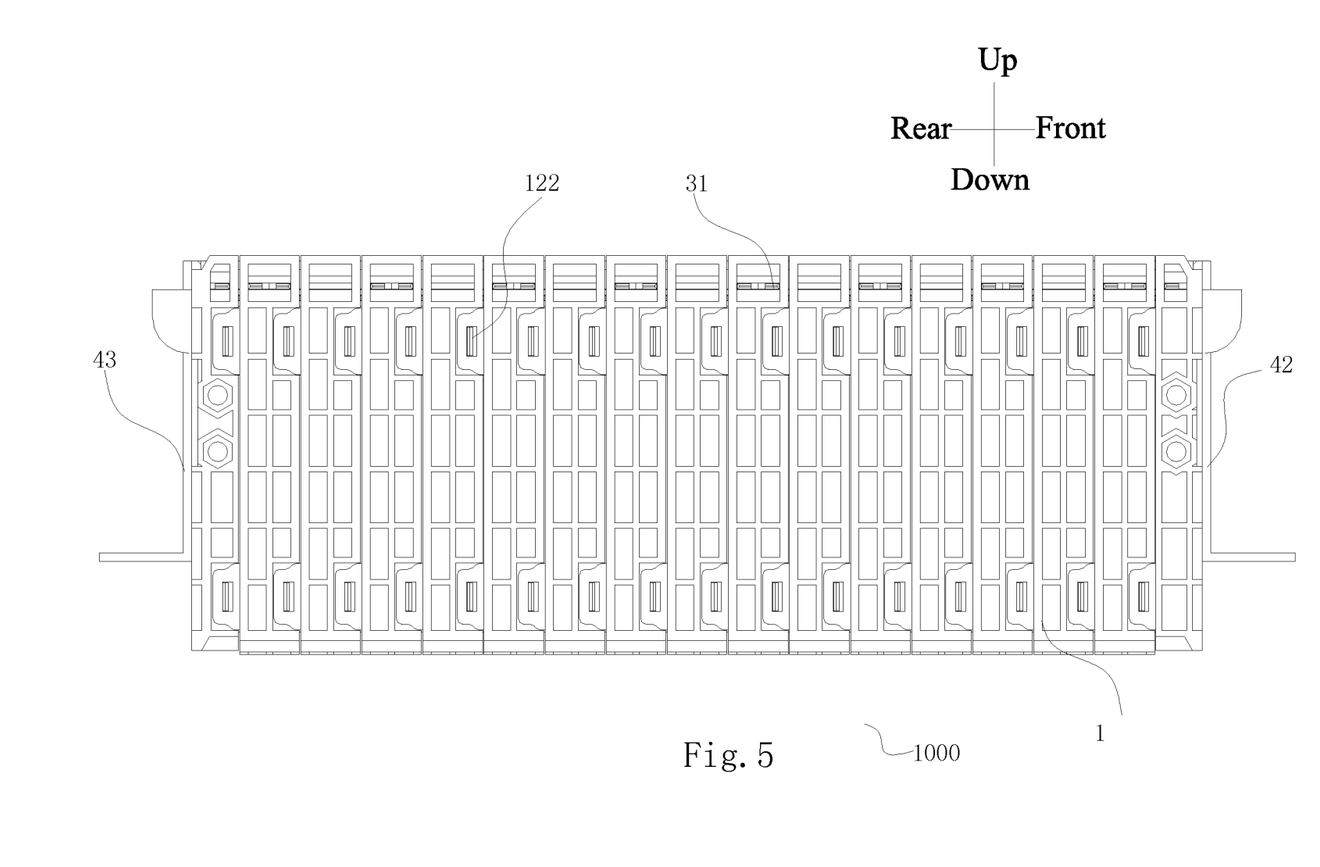
FIG. 5 is a front view of a battery module indicated in FIG. 4 according to an embodiment of the present disclosure.

The housing assembly 200 may further include a pressure bar 4 provided on the outside of the bracket 1 and configured to fix the bracket 1 along the front-rear direction. As shown in FIG. 1 and FIG. 5, the pressure bar 4 includes a first plate 41, a second plate 42 and a third plate 43. The first plate 41 extends along the front-rear direction, and horizontally positioned at the top of the brackets 1 of the battery module 1000. The second plate 42 and the third plate 43 extend vertically and downwardly from the front and rear ends of the first plate 41 respectively. The lower end of the second plate 42 and the third plate 43 are formed with a flange respectively. The flange extends horizontally away from the battery module 1000, and the second plate 42 and the third plate 43 are configured to hold the bracket 1 of the battery module 1000 in the front-rear direction, so that the assembled brackets 1, the batteries 100, the copper bars 2 and the insulating frames 3 may be combined together to fix the battery module 1000 to the mounting body, and the connection strength of the battery module 1000 is improved.

Figure 6:
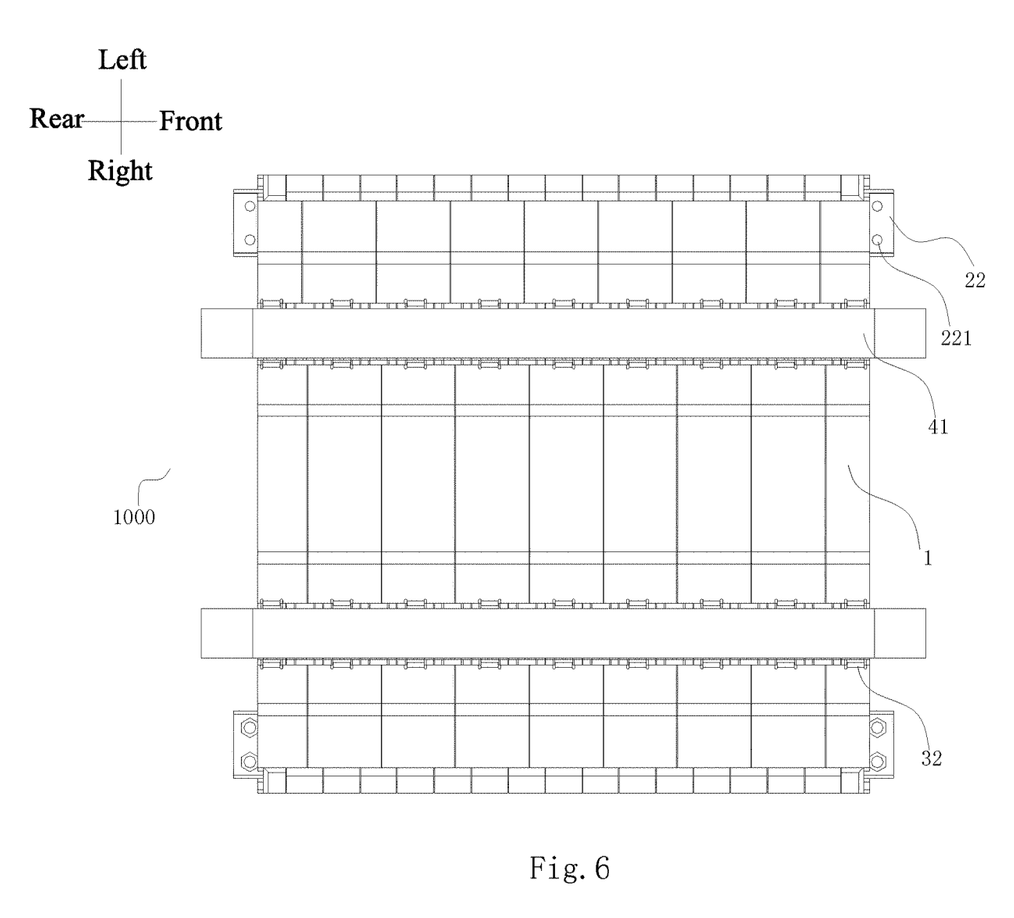
FIG. 6 is a top view of a battery module indicated in FIG. 5 according to an embodiment of the present disclosure.
Figure 7:
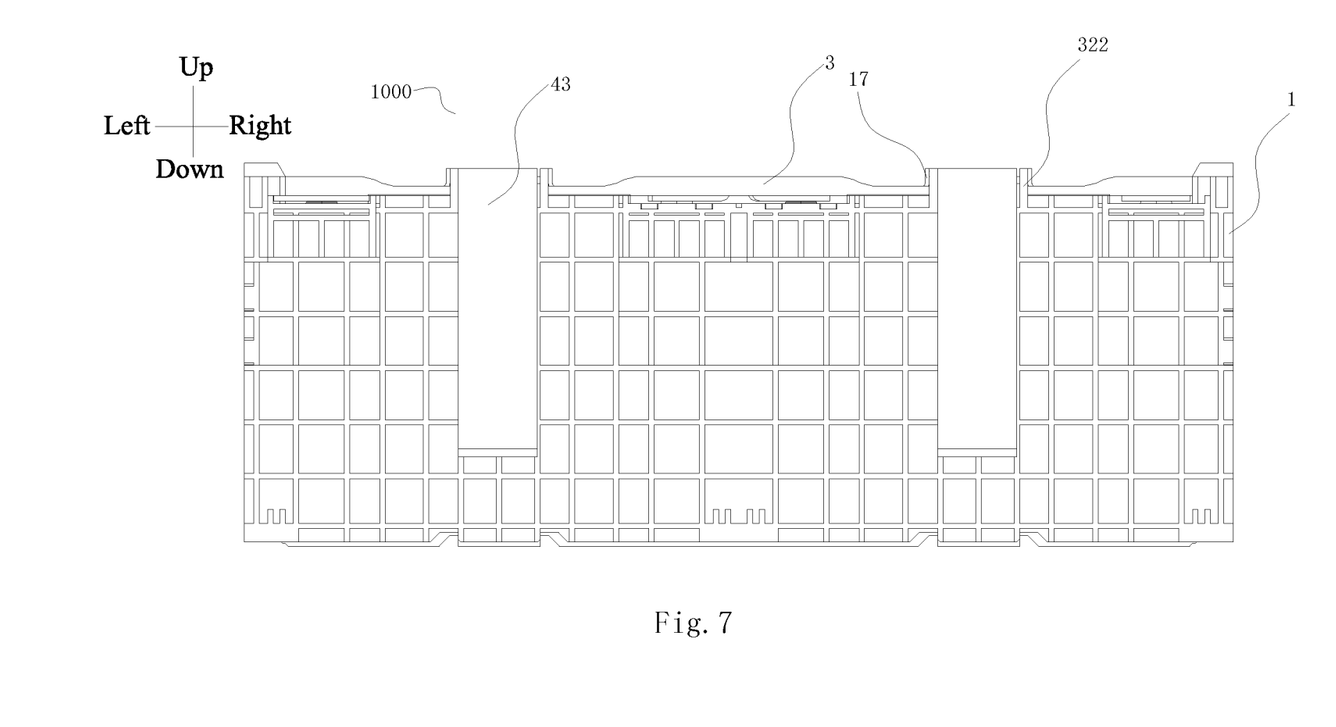
FIG. 7 is a left view of a battery module indicated in FIG. 5 according to an embodiment of the present disclosure.

As shown in FIG. 6 and FIG. 7, the housing assembly may include more than one pressure bars 4, and the pressure bars 4 are spaced from each other in the left-right direction. For example, as shown in FIG. 1, there are two pressure bars 4 are provided, and three rows of insulating frames 3 are space apart by the two pressure bars 4. The top of the bracket 1 may formed with a pressure bar mounting slot for receiving the pressure bar 4, and the pressure bar mounting slot is disposed between two adjacent extension plates 17, whereby the pressure bar 4 may be stably and securely fixed to the top of the bracket 1.

In some embodiments, the battery module 1000 is provided. The battery module 1000 includes the housing assembly 200 described above and the battery 100 received in housing assembly 200.

In some embodiments, the battery 100 is received in a space defined by the housing assembly 200 for receiving the battery 100, and each space receives more than one battery 100, and the width of the bracket 1 in the front-rear direction may be widened according to the needs. Accordingly, the assembly efficiency may be improved.

With the battery module 1000 according to an embodiment of the present disclosure, by implementing the modular design to the housing assembly, the assemble efficiency of the battery module 1000 is improved.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A housing assembly for a battery module, comprising:
   a plurality of brackets, disposed side by side in a front-rear direction and connected in turn by a snap, and each two adjacent brackets defining a space for receiving a battery;
   a plurality of copper bars, disposed vertically on the brackets and having a through-hole adapted for an extension of an electrode of the battery; and
   a plurality of insulating frames, disposed on the copper bars to cover the electrodes of the batteries, wherein the insulating frame is connected with the bracket by a snap and extends in the same direction as that of the copper bar;
   wherein the plurality of brackets comprise a front bracket disposed on the frontmost side of the brackets and a rear bracket disposed on the rearmost side of the brackets, wherein the front bracket has two front fixing blocks located at the front side of the front bracket, and the rear bracket has two rear fixing blocks located at the rear side of the rear bracket, the two front fixing blocks and the two rear fixing blocks are corresponding to each other in the front-rear direction.

2. The housing assembly of claim 1, wherein
   the plurality of copper bars comprise a left copper bar disposed on the leftmost side of the copper bars and a right copper bar disposed on the rightmost side of the copper bars, wherein the front end of the left copper bar and the front end of the right copper bar are disposed on the two front fixing blocks respectively; and the rear end of the left copper bar and the rear end of the right copper bar are disposed on the two rear fixing blocks respectively.

3. The housing assembly of claim 2, wherein each of the front fixing block and the rear fixing block has a flat upper surface, a supporting part is disposed on the front end and the rear end of the left copper bar and the front end and the rear end of the right copper bar respectively to match with the flat upper surface.

4. The housing assembly of claim 2, wherein each of the copper bars includes a plurality of copper bar blocks arranged side by side along the front-rear direction, wherein the supporting part is disposed on the foremost and rearmost end of the left copper bars and the right copper bars respectively.

5. The housing assembly of claim 4, wherein two adjacent copper bars in the front-rear direction of remaining copper bars between the left copper bars and the right copper bars are connected by a first connecting portion.

6. The housing assembly of claim 5, wherein the shape of the first connecting portion is configured as an inverted U.

7. The housing assembly of claim 5, wherein in two middle copper bars arranged in a middle of the plurality of copper bars, two copper bar blocks corresponding to each other in a left-right direction are connected by a second connecting portion.

8. The housing assembly of claim 7, wherein the shape of the second connecting portion is configured as an inverted U.

9. The housing assembly of claim 1, wherein the insulating frames comprises:
 a left insulating frame disposed on the leftmost side of the insulating frames; and
 a right insulating frame disposed on the rightmost side of the insulating frames;
 wherein a first tab is disposed on the left side of the left insulating frame and on the right side of the right insulating frame respectively; and
 wherein a first hole is formed on the left side and right side of the bracket respectively and configured to match with the first tab.

10. The housing assembly of claim 9, wherein a mounting base is disposed on the left side and the right side of the bracket respectively, and the first hole is formed on an opposite side of the mounting base.

11. The housing assembly of claim 9, wherein the cross section of the first tab is configured as a trapezoid or a wedge shape.

12. The housing assembly of claim 9, wherein the insulating frame comprises a middle insulating frame disposed between the left insulating frame and the right insulating frame;
 wherein a second tab is disposed on the left side and right side of the middle insulating frame; and
 wherein a second hole is formed on at least one of the brackets and configured to match with the second tab.

13. The housing assembly of claim 12, wherein an extension plate extends upwardly on the bracket and the second hole is formed on the extension plate.

14. The housing assembly of claim 13, wherein each bracket is formed with the second hole.

15. The housing assembly of claim 13, wherein the surface of the extension plate is concaved downwardly to form a concave, and a horizontal plate on a top of the second tab matches with the concave.

16. The housing assembly of claim 1, further comprising a pressure bar provided on the outside of the bracket and configured to fix the bracket along the front-rear direction.

17. A battery module, comprising:
 the housing assembly according to claim 1; and
 a battery received in a space of the housing assembly for receiving the battery.

18. The battery module of claim 17, wherein each space receives more than one battery.

19. A battery module, comprising:
 a plurality of brackets, disposed side by side in a front-rear direction and connected in turn by a snap, and each two adjacent brackets defining a space that receives a battery;
 a plurality of copper bars, disposed vertically on the brackets and having a through-hole adapted for an extension of an electrode of the battery; and
 a plurality of insulating frames, disposed on the copper bars to cover the electrodes of the batteries, wherein the insulating frame is connected with the bracket by a snap and extends in the same direction as that of the copper bar;
 wherein the plurality of brackets comprise a front bracket disposed on the frontmost side of the brackets and a rear bracket disposed on the rearmost side of the brackets, wherein the front bracket has two front fixing blocks located at the front side of the front bracket, and the rear bracket has two rear fixing blocks located at the rear side of the rear bracket, the two front fixing blocks and the two rear fixing blocks are corresponding to each other in the front-rear direction.

20. The battery module of claim 19, further comprising a pressure bar provided on the outside of the bracket and configured to fix the bracket along the front-rear direction.

* * * * *